(12) United States Patent
Yang et al.

(10) Patent No.: US 10,944,587 B2
(45) Date of Patent: Mar. 9, 2021

(54) EVENT PROCESSING ASSOCIATED WITH A SMART DEVICE

(71) Applicant: BANMA ZHIXING NETWORK (HONGKONG) CO., LIMITED, Kowloon (HK)

(72) Inventors: Jiangbo Yang, Beijing (CN); Chunhui Zhang, Hangzhou (CN); Yanming Cai, Hangzhou (CN); Ji Zhao, Beijing (CN); Wenchao Wang, Beijing (CN); Nan Zhang, Beijing (CN); Hujia Liu, Hangzhou (CN)

(73) Assignee: BANMA ZHIXING NETWORK (HONGKONG) CO., LIMITED, Hong Kong (HK)

( * ) Notice: Subject to any disclaimer, the term of this patent is extended or adjusted under 35 U.S.C. 154(b) by 110 days.

(21) Appl. No.: 16/215,155

(22) Filed: Dec. 10, 2018

(65) Prior Publication Data

US 2019/0182070 A1  Jun. 13, 2019

Related U.S. Application Data

(63) Continuation-in-part of application No. PCT/CN2017/087136, filed on Jun. 5, 2017.

(30) Foreign Application Priority Data

Jun. 17, 2016  (CN) .......................... 201610435323.2

(51) Int. Cl.
*H04L 12/28* (2006.01)
*H04L 29/08* (2006.01)
(Continued)

(52) U.S. Cl.
CPC ............ *H04L 12/282* (2013.01); *G10L 15/26* (2013.01); *H04L 12/281* (2013.01);
(Continued)

(58) Field of Classification Search
CPC ..... H04L 67/12; H04L 67/306; H04L 67/303; H04L 12/2809; H04L 12/2803;
(Continued)

(56) References Cited

U.S. PATENT DOCUMENTS 8,543,534 B2  9/2013  Alves
8,688,820 B1  4/2014  Bhogi
(Continued)

FOREIGN PATENT DOCUMENTS

CN  103702402  4/2014
CN  103888261  6/2014
(Continued)

*Primary Examiner* — Yogeshkumar Patel
(74) *Attorney, Agent, or Firm* — Van Pelt, Yi & James LLP

(57) ABSTRACT

Event processing associated with a smart device is disclosed, including: receiving an indication of an event detected by a function module associated with a smart device; determining, based at least in part on event registration information, that an event message is to be sent to a cloud device; and sending the event message to the cloud device. Event processing associated with a smart device also includes: receiving an indication of an event detected by a first function module associated with a smart device; determining, based at least in part on event registration information, that a control message is to be sent to a second function module associated with the smart device; and sending the control message to the second function module associated with the smart device.

17 Claims, 13 Drawing Sheets

(51) Int. Cl.
  *G10L 15/26* (2006.01)
  *G06F 3/16* (2006.01)

(52) U.S. Cl.
  CPC .......... H04L 12/2827 (2013.01); H04L 29/08 (2013.01); *G06F 3/167* (2013.01); *H04L 2012/285* (2013.01); *H04L 2012/2849* (2013.01)

(58) Field of Classification Search
  CPC ............... H04L 12/2834; H04L 12/281; H04L 12/2812; H04L 12/282; H04L 12/2827; H04L 2012/2841; H04W 4/70
  See application file for complete search history.

(56) References Cited

U.S. PATENT DOCUMENTS

| | | | |
|---|---|---|---|
| 8,977,741 | B1 | 3/2015 | Fredinburg |
| 9,413,827 | B2 | 8/2016 | Sharma |
| 9,942,696 | B2 | 4/2018 | Unter Ecker |
| 9,989,942 | B2 | 6/2018 | Glickfield |
| 10,158,536 | B2 | 12/2018 | Kim |
| 10,171,586 | B2 | 1/2019 | Shaashua |
| 10,230,798 | B2 | 3/2019 | Doraiswamy |
| 2003/0017822 | A1 | 1/2003 | Kissner |
| 2007/0055750 | A1 | 3/2007 | Wang |
| 2012/0323690 | A1 | 12/2012 | Michael |
| 2014/0164525 | A1 | 6/2014 | Malik |
| 2014/0337431 | A1 | 11/2014 | Naseh |
| 2015/0067154 | A1* | 3/2015 | Ly .......................... H04L 67/26 709/224 |
| 2015/0100167 | A1 | 4/2015 | Sloo |
| 2015/0185713 | A1* | 7/2015 | Glickfield .............. G05B 15/02 700/44 |
| 2016/0088540 | A1 | 3/2016 | Wang |
| 2016/0105360 | A1 | 4/2016 | Erickson |
| 2016/0105424 | A1 | 4/2016 | Logue |
| 2016/0127928 | A1 | 5/2016 | McClure |
| 2016/0173318 | A1 | 6/2016 | Ha |
| 2016/0226732 | A1* | 8/2016 | Kim ................ H04W 12/04031 |
| 2016/0316363 | A1 | 10/2016 | Li |
| 2017/0034564 | A1 | 2/2017 | Jamal-Syed |
| 2017/0083386 | A1 | 3/2017 | Wing |
| 2017/0188248 | A1 | 6/2017 | Müller |

FOREIGN PATENT DOCUMENTS

| | | |
|---|---|---|
| CN | 104104532 | 10/2014 |
| CN | 104202353 | 12/2014 |
| CN | 204014088 | 12/2014 |
| CN | 104302018 | 1/2015 |
| CN | 104601695 | 5/2015 |
| CN | 104679493 | 6/2015 |
| CN | 105182783 | 12/2015 |
| CN | 105182784 | 12/2015 |
| CN | 105632494 | 6/2016 |
| CN | 105676655 | 6/2016 |
| CN | 105704234 | 6/2016 |
| WO | 2016089262 | 6/2016 |
| WO | 2016184253 | 11/2016 |

\* cited by examiner

EVENT PROCESSING ASSOCIATED WITH A SMART DEVICE

CROSS REFERENCE TO OTHER APPLICATIONS

This application is a continuation-in-part of and claims priority to International (PCT) Application No. PCT/CN2017/087136, entitled EVENT PROCESSING METHOD, APPARATUS AND DEVICE FOR INTERNET OF THINGS, filed Jun. 5, 2017 which is incorporated herein by reference for all purposes, which claims priority to China Application No. 201610435323.2, entitled AN EVENT PROCESSING METHOD, MEANS AND DEVICE FOR THE INTERNET OF THINGS, filed Jun. 17, 2016 which is incorporated herein by reference for all purposes.

FIELD OF THE INVENTION

The present application relates to a field of computer applications technology. In particular, the present application relates to an event processing for an Internet of Things smart device.

BACKGROUND OF THE INVENTION

Intelligent hardware is a technological concept that originated with smart phones. Traditional devices are transformed by combining hardware with software and then endowing them with smart functions (e.g., the ability to query information over the Internet). Intelligent products on the market include, for example, smart devices such as smart home appliances, smart automobiles, smart wearable devices, and smart medical devices.

The processing of events (such as timer events, speech recording events, and events triggered by specific conditions) is an invariable aspect of implementing the various functions of smart devices. However, in the prior art, the processing of such events is nearly always restricted to the operating system level of the smart device. The restriction is severe. Furthermore, in the conventional system, event processing cannot be easily applied to device-level interconnections or to interactions between modules.

SUMMARY OF THE INVENTION

Embodiments described herein provide flexible schemes of event processing associated with a smart device.

The present application discloses techniques comprising:

Receiving an indication of an event detected by a function module associated with a smart device;

Determining, based at least in part on event registration information, that an event message is to be sent to a cloud device; and Sending the event message to the cloud device.

The present application further discloses techniques comprising:

Receiving an indication of an event detected by a first function module associated with a smart device;

Determining, based at least in part on event registration information, that a control message is to be sent to a second function module associated with the smart device; and Sending the control message to the second function module associated with the smart device.

The event processing mechanism provided by the present application overcomes the conventional restriction of limiting events to the system level and also makes it possible to apply event processing to interactions between smart devices and a cloud device, interactions with other smart devices via the Internet of Things, or interactions between internal function modules of a smart device.

BRIEF DESCRIPTION OF THE DRAWINGS

Various embodiments of the invention are disclosed in the following detailed description and the accompanying drawings.

DETAILED DESCRIPTION

Figure 1:
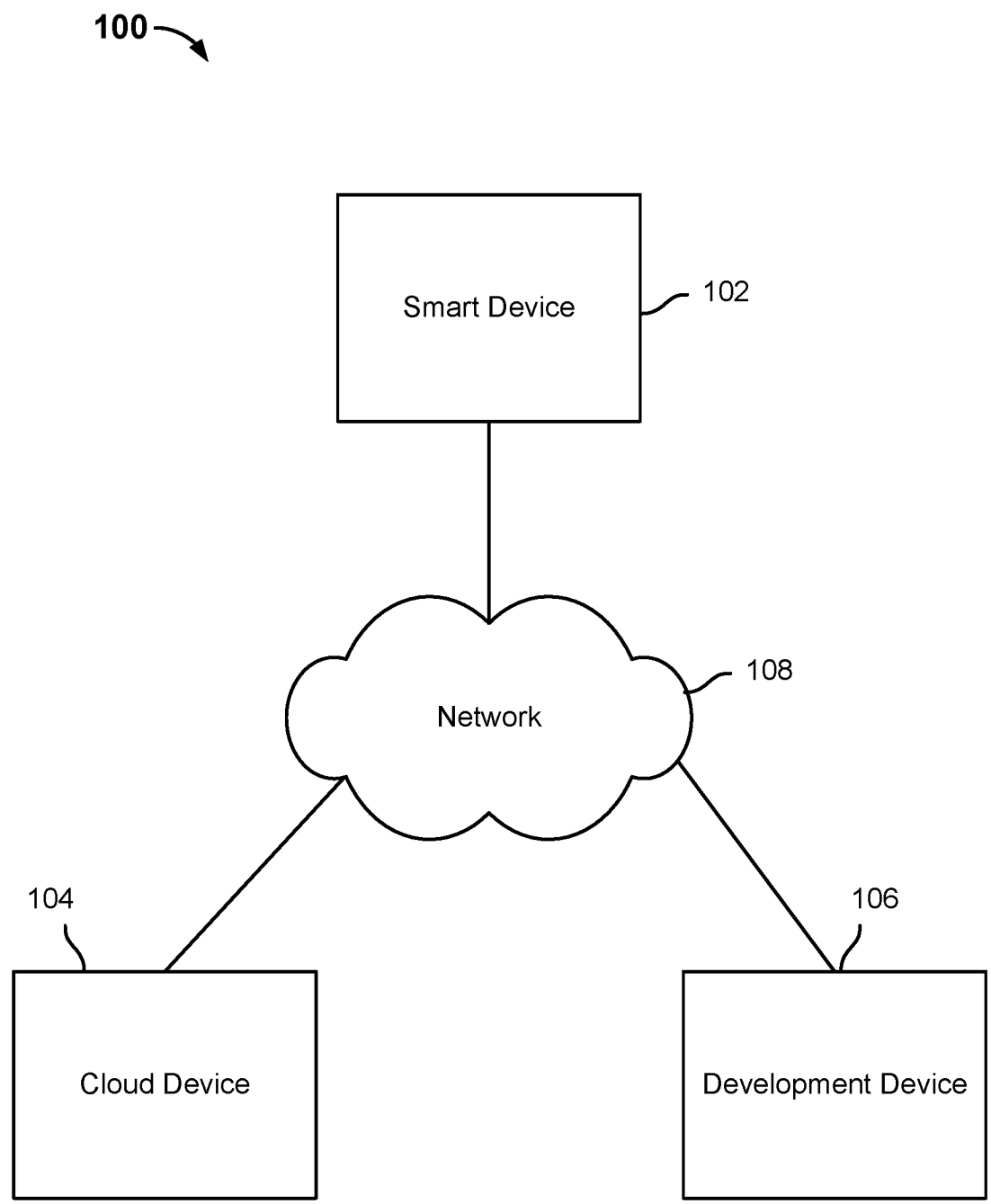
FIG. 1 is a diagram showing an embodiment of a system for event processing associated with a smart device.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In order to further clarify the goals, technical schemes, and advantages of the present invention, the present invention is described in detail below in light of the drawings and specific embodiments.

The terms used in embodiments of the present invention merely serve to describe specific embodiments and are not intended to restrict the present invention. "A," "said," and "the" or "this" as used in their singular form in embodiments of the present invention and the claims also are intended to encompass the plural form, unless otherwise clearly indicated by the context.

Please note that the term "and/or" used herein is merely a relationship describing related objects. It may indicate three kinds of relationships. For example, A and/or B may indicate the three situations of: only A exists, A and B both exist, and only B exists. In addition, the symbol "/" herein generally expresses an "or" relationship between the preceding and following objects.

Depending on context, the word "if" when used herein may be interpreted as "when" or "upon" or "in response to the determination that" or "in response to the detection of." Depending on the context, the phrase "upon determining" or "upon detecting (a stated condition or event)" may be understood as "when it is determined" or "in response to the determination that" or "upon detecting a stated condition or event" or "in response to the detection of (a stated condition or event)."

Embodiments of event processing associated with a smart device are described herein. In some embodiments, an event detected by a first function module of a smart device causes the smart device to interact with a cloud device. In some embodiments, an event detected by a first function module of a smart device causes a control instruction to be sent to a second function module of the same smart device.

FIG. 1 is a diagram showing an embodiment of a system for event processing associated with a smart device. In the example of FIG. 1, system 100 includes smart device 102, network 108, cloud device 104, and development device 106. Network 108 may comprise high-speed networks and/or telecommunication networks (e.g., a wide area network, a local area network, the internet, or the internet using mobile communication technology). Cloud device 104 may comprise a cloud server or cloud device 104 may be a server cluster that includes multiple servers. Smart device 102 may be a device such as a smart home device, a smart network device, a smart automobile, a smart wearable device, a smart medical device, or any appropriate Internet-enabled device. Smart home devices may include, for example, intelligent hardware-based home appliances such as smart TVs, smart air-conditioning, smart water heaters, smart lamps, smart doors and windows, smart refrigerators, and smart air purifiers. Smart network devices may include, for example, switches and wireless access points that include intelligent hardware. Smart wearable devices may include, for example, smart watches, smart glasses, smart bracelets, smart helmets, augmented reality (AR) devices, and virtual reality (VR) devices, all of which include intelligent hardware. Smart medical devices may include, for example, smart thermometers, smart blood pressure monitors, and smart blood glucose meters, all of which include intelligent hardware. As will be described in further detail below, in various embodiments, events that are detected within smart device 102 are processed by a unit included in smart device 102 that is referred to as a "control center." In various embodiments, the control center of a smart device may be implemented using hardware and/or software. Smart device 102 may include one or more function modules, where each function module is configured to perform a corresponding specific function. Examples of a function module include a power module, control module, and detection module.

Figure 2:
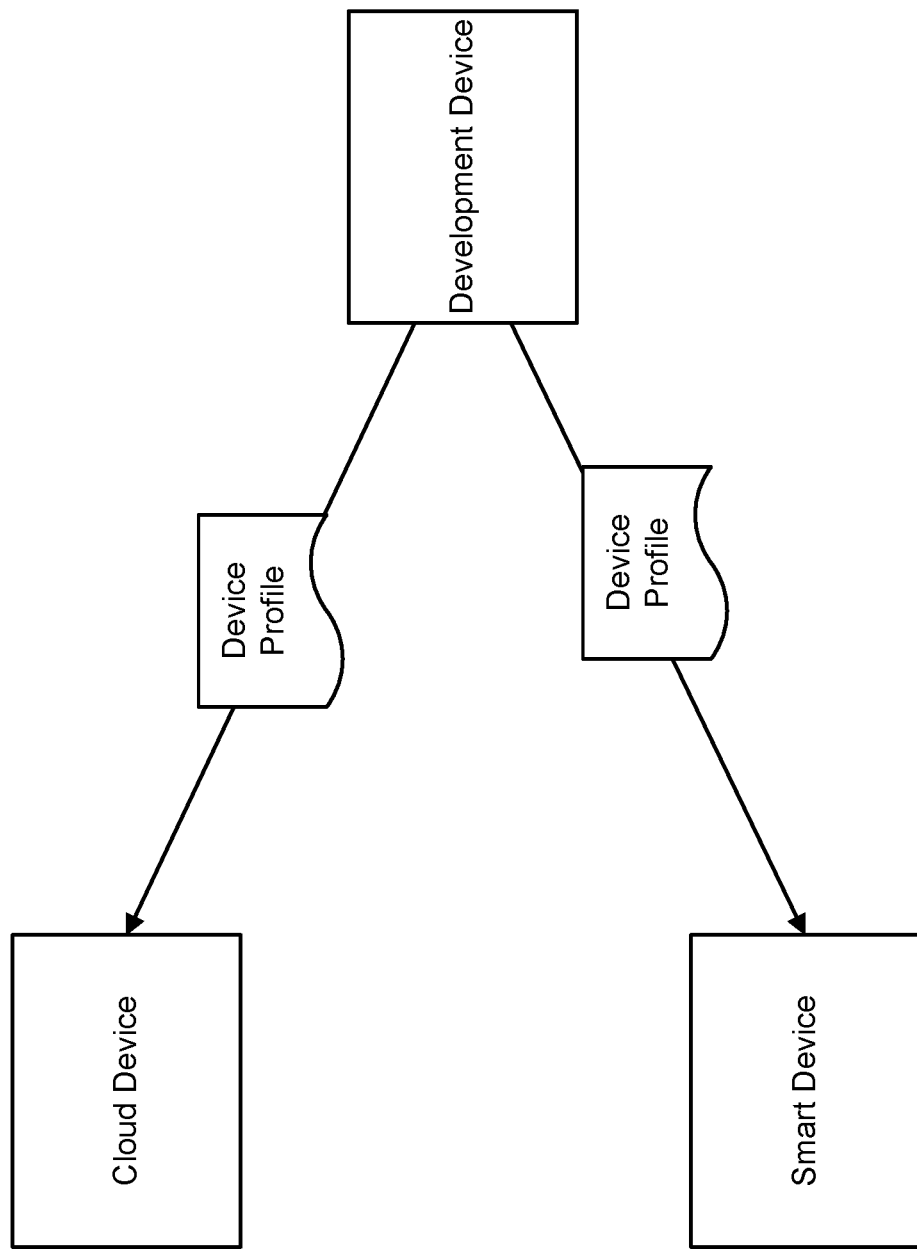
FIG. 2 shows a diagram of a development device sending a device profile to a cloud device and to a smart device.
Figure 3:
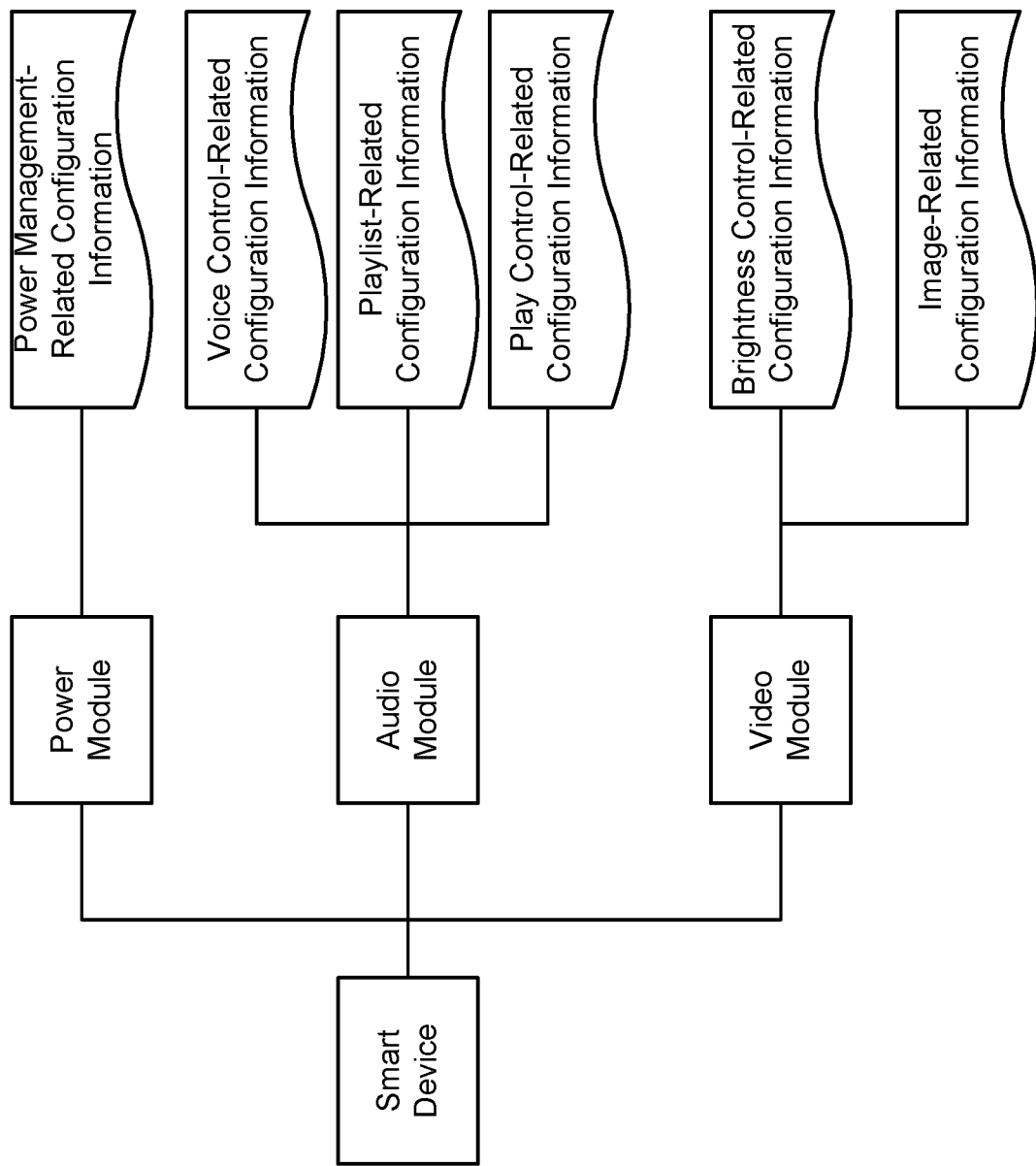
FIG. 3 shows an example device profile.

Development device 106 is configured to send device profiles to each one or both of smart device 102 and cloud device 104. FIG. 2 shows a diagram of a development device sending a device profile to a cloud device and to a smart device. The device profiles in FIG. 2 that are sent to the cloud device and to the smart device may include the same or different content. In various embodiments, a "device profile" comprises a document comprising a set of event-related configuration information. In various embodiments, a device profile may be organized in the form of a tree-structured (e.g., hierarchical) header file directory. The sub-node of each node in the tree-structured header file directory may be a sub-function (which is implemented by a corresponding functional module of a smart device) of the node. FIG. 3 shows an example device profile. In the example device profile of FIG. 3, the root node is a smart device. The sub-nodes include: power module, audio module, video module. The device profile may also have sub-nodes at more levels, but these will not be listed exhaustively in the figure. Each of the respective nodes corresponding to the power module, audio module, and video module has configuration information. For example, each of the respective nodes corresponding to the power module, audio module, and video module has one or more event identifiers (names) and their corresponding arguments. As shown in FIG. 3, the node corresponding to the power module may include configuration information relating to power management (stored as power_manage.h). The node corresponding to the audio module may include configuration information relating to voice control (voice_control.h), configuration information relating to the playlist (play_list.h), and configuration information relating to play control (play_control.h). The node corresponding to the video may include configuration information relating to brightness control (light_control.h) and configuration information relating to images (image.h). The ".h" is the format suffix for configuration information.

Returning to FIG. 1, in response to receiving a device profile from development device 106, smart device 102 is configured to perform event registration based on the device profile. In some embodiments, event registration performed at smart device 102 may include the control center analyzing a device profile and locally registering the event identifiers contained in the device profile. In some embodiments, event registration performed at smart device 102 may include the control center analyzing a device profile and locally registering the event identifiers contained in the device profile and also registering event arguments corresponding to the event identifiers that are contained in the device profile. In some embodiments, event registration performed at smart device 102 may further include: the control center analyzing a device profile and locally registering the correspondences between action identifiers and control instructions/control arguments contained in the device profile. In various embodiments, a "control instruction" comprises computer code or a command. In various embodiments, "control arguments" comprise arguments/variables/values that are to be used during the execution of the control instruction. In various embodiments, "registering" includes locally recording/storing the information to be registered (e.g., just event identifiers or event identifiers and corresponding event arguments). An event identifier may take on the form of a number (also referred to as an "event id"), an alphanumerical string (also referred to as an "event name"), or other appropriate type of identifier. For purposes of illustration, "event name" is the example event identifier that will be referred to in examples described below. The registered event names are associated with the events that are to be reported to cloud device 104 via event messages.

In some embodiments, event registration at smart device 102 may further include function module registration. For example, part of a device profile that is sent by development device 106 or as a separate file that is sent by development device 106 to smart device 102 or directly sets it up in advance in the smart device 102 is a function module registration file. The function module registration file may include initialization process information for each function module of smart device 102, with the result that smart device 102 can automatically run the initialization process for each function module at system startup. In addition, the function module registration file may also include the event names for which the reporting thereof is supported by which function module of smart device 102. As a result, each function module can report, to the control center of smart device 102, the event name in the stored event registration information that corresponds to a detected event. The smart device control center can perform function module registration based on the function module registration file including by analyzing the device profile and/or function module registration file to locally store event names and/or event names and event arguments that are to be detected and reported to the control center by each of one or more function modules of smart device 102.

In response to receiving a device profile from development device 106, cloud device 104 is configured to perform event registration based on the device profile. Similar to the event registration that is performed at smart device 102, event registration at cloud device 104 involves locally registering the event identifiers contained in the device profile or locally registering the event identifiers contained in the device profile and also registering event arguments corresponding to the event identifiers. In some embodiments, cloud device 104 also registers destination device identifiers associated with each set of event names, event arguments, and/or action identifiers. The destination device identifiers identify smart devices to which an action identifier is to be sent. Event registration at cloud device 104 further includes registering the action identifiers corresponding to event information (e.g., various combinations of event names and/or event arguments related to the event names). In various embodiments, an "action identifier" comprises an identifier that identifies a control instruction that is to be sent by cloud device 104 to and performed at smart device 102 in response to event messages that are received from smart device 102 or from another smart device other than smart device 102. By sending an action message (that includes an action identifier) to a smart device, cloud device 104 exercises control over the destination smart device because the destination smart device is configured to execute the control instruction associated with the action identifier that is included in the action message, which will be described in further detail below.

In some embodiments, event registration may be performed at smart device 102 in response to one or more triggers. Examples of such triggers include when smart device 102 is being activated, when smart device 102 is being upgraded, and when the device profile is received from development device 106. The mechanism of event registration at smart device 102 and/or cloud device 104 based on a device profile received from development device 106 enables the process of upgrading smart device 102 and/or cloud device 104 to become easier for a developer. For example, upgrading smart device 102 includes sending an updated device profile to smart device 102 to cause smart device 102 to handle event processing differently such as which events should be reported to cloud device 104 and/or which control instruction corresponds to which action identifier. For example, upgrading cloud device 104 includes sending an updated device profile to cloud device 104 to cause cloud device 104 to handle action processing differently such as which control instruction should be performed at smart device 102 in response to a detected event at smart device 102. Given such a mechanism, the developer need only update the device profile that is to be sent to the smart device and/or the cloud device. If the developer wanted to update multiple smart devices in the same manner, the developer could just instruct development device 106 to send a copy of the same updated device profile to each of these smart devices instead of manually reconfiguring each of the smart devices or cloud devices. Furthermore, the mechanism of sending device profiles to the smart device and the cloud device allows the configurations of the two devices to be quickly synchronized without either device having to contact the other device to manually synchronize their stored configuration information. For example, when there is new event registration information, an updated device profile that includes this new event registration information may be sent to smart device 102 and cloud device 104. As such, cloud device 104 and smart device 102 may easily achieve new event registration through the registration mechanism described above. In response to receiving an updated device profile, cloud device 104 and/or smart device 102 may locally store only the content (e.g., event information and/or action messages) that is new relative to a previously received device profile and not redundantly register the content that is not new relative to a previously received device profile, thus saving storage space and communication bandwidth.

Figure 4:
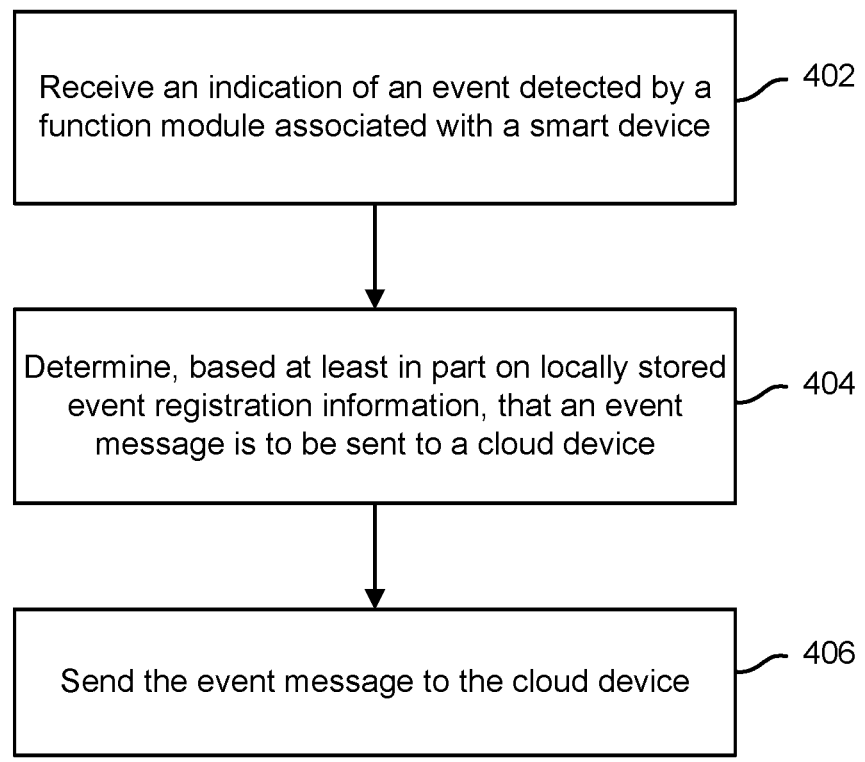
FIG. 4 is a flow diagram showing an embodiment of a process for event processing associated with a smart device.

FIG. 4 is a flow diagram showing an embodiment of a process for event processing associated with a smart device. In some embodiments, process 400 is implemented at smart device 102 of system 100 of FIG. 1. Specifically, in some embodiments, process 400 is implemented at a control center of smart device 102 of system 100 of FIG. 1.

Process 400 describes an embodiment in which an event that is reported by a function module in a smart device causes the smart device to send an event message to a cloud device.

At 402, an indication of an event detected by a function module associated with a smart device is received.

In various embodiments, a smart device includes one or more function modules, where each function module refers to a set of program elements capable of performing a certain function in a smart device. Generally, one function module corresponds to one function of a smart device. However, function granularity is relatively flexible. For example, a light detecting module and a switching module can both be function modules in a smart lamp. In various embodiments, each of the various function modules in the smart device conducts monitoring of the one or more events that it supports. As soon as a function module detects an event, the function module reports the event to the control center of the smart device.

The detected event is reported by the function module to the control center of the smart device using at least an event name associated with the event.

At 404, it is determined that an event message is to be sent to a cloud device based at least in part on event registration information.

At 406, the event message is sent to the cloud device.

In some embodiments, the event name associated with the detected event is compared to stored event registration information to determine whether there is a match. As described above, event registration information comprises at least event names and corresponding event arguments that are locally registered at the smart device based on a device profile that was received at the smart device. If the event name associated with the event that is detected by the function module matches an event name that is included in the stored event registration information, then an event message that includes the event name and its corresponding one or more arguments in the stored event registration information is generated and sent to a cloud device. Examples of a response that is returned by the cloud device in response to an event message are described in further detail below.

Figure 5:
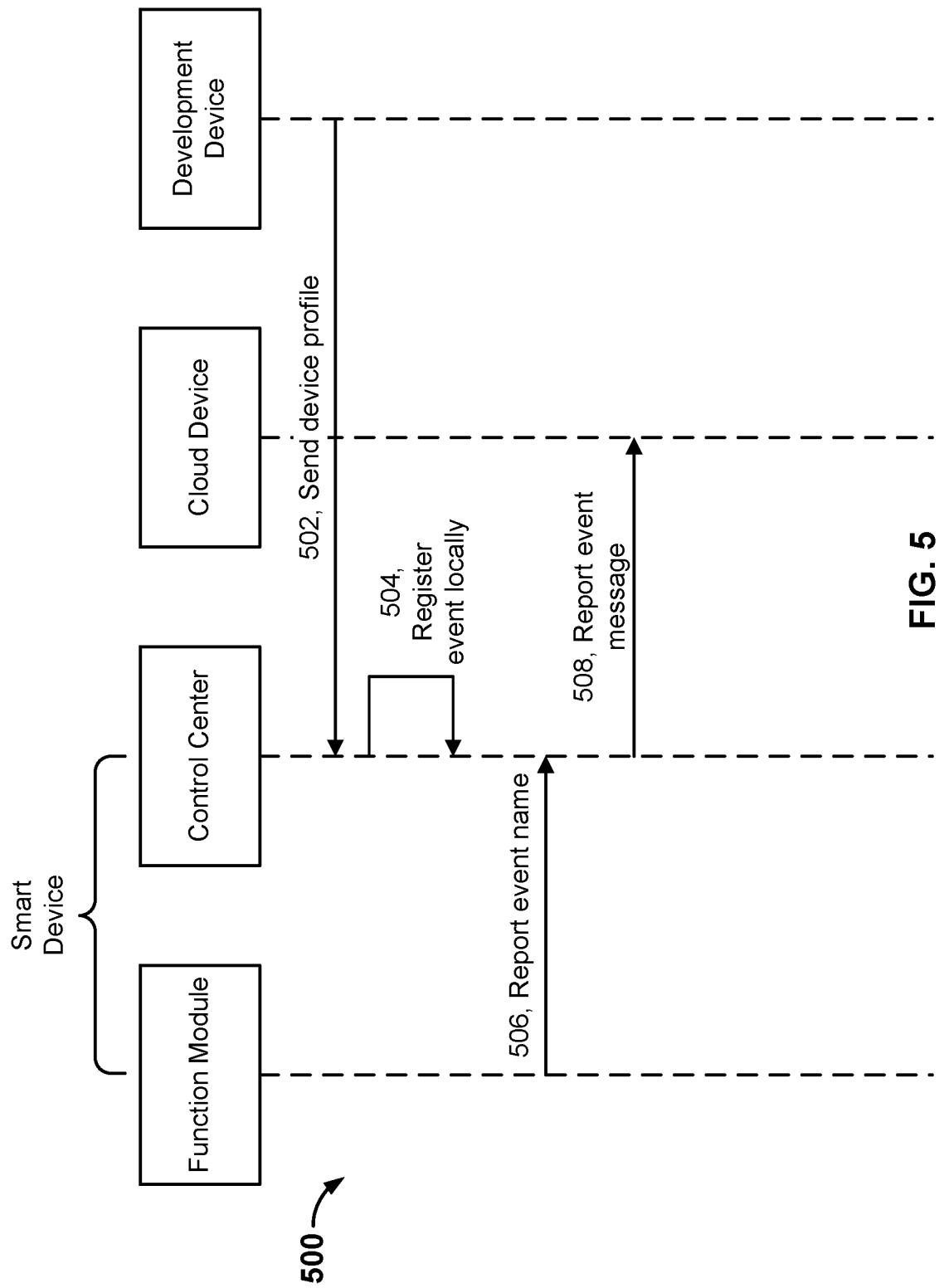
FIG. 5 is a sequence diagram showing an example of a process for event processing associated with a smart device.

FIG. 5 is a sequence diagram showing an example of a process for event processing associated with a smart device. The smart device, cloud device, and development device of the example of FIG. 5 may be implemented, for example, using smart device 102, cloud device 104, and development device 106 of system 100 of FIG. 1. Process 400 of FIG. 4 may be implemented using process 500.

At 502, a device profile sent by a development device is received at a control center associated with a smart device.

At 504, event registration is locally performed by the control center associated with the smart device based at least in part on the device profile, wherein the event registration comprises storing event registration information comprising event information associated with events for which a corresponding event message is to be sent to a cloud device. In the example of process 500, event registration at the control center of the smart device includes storing event names and corresponding event arguments that are included in the device profile. As will be described below, if an event that is detected by a function module at the smart device matches an event name that is included in the stored event registration information, an event message that includes that event name and its corresponding one or more event arguments from the event registration information will be generated by the control center and sent to a cloud device.

As described above, a developer may define a device profile for its own intelligent hardware (i.e., smart device) and then use a development device to send the device profile to the smart device and cloud device. In this manner, the smart device developer can implement remote event configuration. For example, a device profile may define event names and their corresponding event arguments using the following example format: "Event name: event arguments." The following example event name ("power_low") and corresponding event argument associated with the event of a smart device having less than a 10% charge in its battery may be included in the device profile:

event1 name: power_low args: 10%

In some embodiments, a general device profile may be provided for one type of smart device. For example, the smart speakers of smart speaker A and smart speaker B, which are developed by different developers, both have play, pause, restore, volume-setting, and other functions. These two smart speakers may share the same device profile, which is a general device profile associated with the smart speaker type of smart devices. If each of the two smart speakers has its own distinctive functions, then a distinct device profile may be defined for each smart speaker to accommodate their respective functions. By allowing multiple smart devices to share a device profile and by permitting smart devices to receive customized device profiles, as appropriate, redundant efforts in generating device profiles for smart devices may be reduced while the configuration of smart devices using device profiles may be encouraged. At the same time, the flexible use of device profiles improves the popularization of intelligent hardware by lowering the threshold to develop and upgrade them.

It should be noted that the developer, in addition to using a development device to send a device profile to a smart device control center, may also preconfigure a device profile in the control center. For example, the device profile may be preconfigured in the control center when the smart device is shipped from the factory. It is also possible for a user to self-define the configuration of the device profile for a smart device in accordance with one's own operating habits or actual use needs. For example, the device profile may be configured through an interface provided by the smart device to the user, and the smart device control center may then store the user-configured device profile. The several approaches to configuring device profiles described above enable both developers and smart device users to configure smart device control schemes flexibly according to need.

At 506, an event name associated with an event reported by a function module associated with the smart device is obtained by the control center.

After a function module detects an event, it reports the event name of the event to the control center.

At 508, in response to a determination by the control center that the event name matches stored event registration information, a corresponding event message is sent to the cloud device.

When the control center sends an event message to the cloud device, in some embodiments, the event message may include only the event name. For example, such an approach may apply if the same event name and its corresponding event arguments were registered by the cloud device during its event registration. In some embodiments, the event message may include the event name and its corresponding event arguments. For example, such a situation may apply if the event arguments corresponding to the event name were not registered by the cloud device during its event registration.

In response to receiving the event message, the cloud device may perform various operations based on the event message. In a first example, the cloud device may record the received event information without performing any confirmation of the event message. In a second example, the cloud device may perform the following processing:

In a first example situation, the cloud device compares the event name of the event message to its own stored event registration information to determine a match. Then, the cloud device is configured to determine a control instruction corresponding to the event name within its stored event registration information and to send that control instruction in an action message to the smart device. That is, the cloud device, on the basis of the received event name, may exercise control over the smart device that had reported the event message. For example, a reported event related to "start speech recording" may cause the cloud device to send an action message to cause the smart device to perform speech recording.

Figure 6:
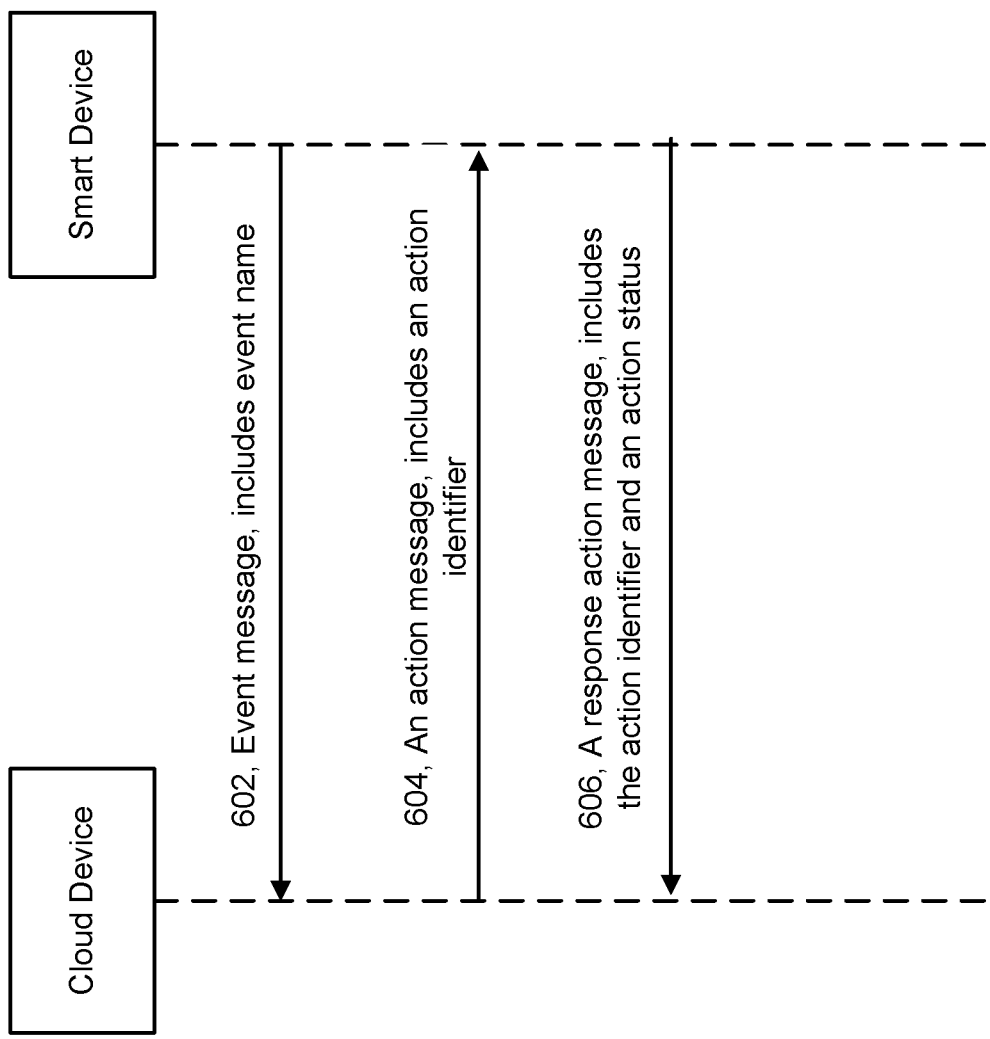
FIG. 6 is a sequence diagram that shows an example of a cloud device sending an event response message to a smart device from which it had received an event message from the smart device.

In a second example situation, the cloud device has locally registered event names and corresponding destination device identifiers as well as control instructions. A destination device identifier may refer to the smart device that had sent the event message or to another device. An example scenario in which a destination device identifier refers to a smart device other than the one that had sent the event message to the cloud device applies when a first smart device event serves as a basis to cause the cloud device to exercise control over a second, different smart device. After a cloud device receives an event name reported by a smart device, it determines the destination device identifier and control instruction corresponding to the locally registered event name and sends the determined control instruction to the smart device corresponding to the destination device identifier using an action message. FIG. 6, which will be described below, shows an example sequence diagram of interactions between a smart device and a cloud device after the smart device sends an event message to the cloud device.

In some embodiments, to improve security, the event message reported by a smart device to the cloud device may include device identifier information associated with the smart device that had sent the event message. After the cloud device receives the event message, it may first perform identity verification based on the device identification information included in the event message. That is, the cloud device may use the device identification information included in the event message to verify whether the smart device is one that is authorized to send event messages to the cloud device. For example, the cloud device may perform such a verification by comparing the device identification information included in the event message to a list of authorized device identifiers. If the device identification information included in the event message does not match any on a list of authorized device identifiers, the cloud device will discard the event message and not perform any action with respect to the event message.

A device identifier of the smart device may be any information that is capable of uniquely identifying the smart device. In some embodiments, a device identifier of the smart device is a unique Internet of Things identifier centrally allocated to smart devices by an identifier allocating device. The Internet of Things identifier may be permanently set in a chip of the smart device when it is shipped from the factory and therefore is not easily falsified or illicitly acquired. Authorized or legitimate device identifiers may be preset in the cloud device, in some embodiments. If smart device identifiers are centrally allocated by an identifier allocating device, the cloud device may acquire authorized device identifiers from the identifier allocating device in advance.

In some embodiments, the event message may include content fields in addition to an event name, event arguments, and/or device identification information.

In some embodiments, the cloud device may be configured to not respond to any event messages (e.g., not to respond with an action message comprising a control instruction). In some embodiments, the cloud device may be configured to not respond to those event messages whose event names do not match those in locally stored event registration information, as described above.

If the cloud device is configured to respond to a received event message with an event response message to the smart device, in some embodiments, the smart device may maintain a timer after sending the event message such that if it does not receive the event response message (e.g., an action message) within a set period of time after it reported the event message, the smart device may resend the event message to the cloud device. In some embodiments, the number of times that the smart device resends the event message to the cloud device may be limited. For example, the event response message may comprise an acknowledgement of receipt of the event message and/or an action message with a control instruction. The event response message may include the event name, which is used to identify the correspondence with the event message.

FIG. 6 is a sequence diagram that shows an example of a cloud device sending an event response message to a smart device from which it had received an event message from the smart device. The smart device and cloud device of the example of FIG. 6 may be implemented, for example, using smart device 102 and cloud device 104 of system 100 of FIG. 1. Process 400 of FIG. 4 may be implemented based at least in part on the sequence diagram of FIG. 6.

At 602, an event message is sent from a smart device to a cloud device, wherein the event message includes at least an event name. In some embodiments, the event message additionally includes one or more event arguments.

At 604, in response to the event message, an action message is sent from the cloud device to the smart device, wherein the action message includes an action identifier.

After the cloud device receives the event message reported by the smart device, the cloud device sends back the action message to that smart device. In some embodiments, the cloud device's control over a smart device is based on some specific events. For example, when the smart device reports an event message to the cloud device, the cloud device looks up the stored logic associated with the event name included in the event message. Logic comprising correspondences between event names and action identifiers (e.g., action names) may be preset in the cloud device. By looking up the logic associated with the event name, the cloud device may determine the action identifier corresponding to the event name. The logic may include an action identifier corresponding to an event name as well as one or more corresponding control arguments. Once the cloud device determines the action identifier and optionally, control arguments corresponding to the event name/action identifier included in the event message, the cloud device is configured to send the action identifier and control arguments in an action message back to the smart device for the smart device to perform the action associated with the action identifier using the control arguments.

In various embodiments, an "action" comprises a set of control information issued by a cloud device to smart devices. An action corresponds to one or more of the various functions provided by smart devices. An action issued by a cloud device may correspond to one action, or it may correspond to a series of actions. To differentiate between different actions, action identifiers (e.g., names) may be used to label and differentiate between different actions. As mentioned above, action identifiers may also correspond to specific control arguments. The control arguments may include action types, such as play, pause, etc. Some actions, such as pause, only require an action type, but other actions, such as play and increase volume, require other arguments, e.g., play object and magnitude of volume increase. These action identifiers and their corresponding control arguments may be defined by the device profile. The device profile may use the following format: "Action identifier: control arguments," where multiple control arguments may be separated by commas. For example:

action1 name: play, args: "Little Apple"
action2 name: pause

Where the action corresponding to "action1 name" is "play Little Apple," and the action corresponding to "action2 name" is "pause."

In various embodiments, an "action identifier" comprises or at least identifies a control instruction to be performed at a smart device. For example, after the cloud receives a message related to a "start speech recording" event from a smart device, the cloud device is configured to send, back to the smart device, an action message that includes an action identifier and any related control arguments to cause the smart device to perform a set of control executions associated with recording speech. In various embodiments, the smart device stores logic that comprises correspondences between various action identifiers and control instructions. As such, when the smart device receives the action message, the smart device is configured to use locally stored logic to determine the control instruction corresponding to the action identifier included in the action message and to execute the relevant control instruction.

In another situation, after the cloud device receives the event message reported by the smart device, the cloud device sends back the action message to another, different smart device. As mentioned above, the logic that is stored at a cloud device may include correspondences between event names and action identifiers. In some embodiments, the correspondences between event names and action identifiers may also include destination device information. Put another way, it is possible for the cloud device to use an event name from an event message to determine a corresponding action identifier (and/or any control arguments) as well as the destination device identifier and then to include the action identifier (and/or any control arguments) in an action message and send it to the smart device corresponding to the destination device identifier. The smart device corresponding to the destination device identifier may not necessarily be the same smart device from which the event message was originally received.

With regard to the two situations described above, before the cloud device sends an action message, it may first determine whether the destination terminal device identification information (e.g., destination device identification information that is associated with the corresponding action identifier, identification information of the smart device that sent the event message, or registered destination device identification information corresponding to the event name) corresponding to the action message is an authorized device identifier. If not, then the cloud device prohibits sending of the action message to the smart device. If the destination terminal device is an authorized device identifier, then and only then does the cloud device permit the action message to be sent to the smart device.

Authorized device identifiers may be preset in the cloud device. If smart device identifiers authorized are centrally allocated by an identifier allocating device, the cloud device may acquire legitimate device identifiers from the identifier allocating device in advance.

The action message may also include content fields in addition to the action identifier, control arguments, and/or destination smart device identification information.

At 606, an action response message is sent by the smart device to the cloud device, wherein the action response message includes the action identifier and an action status.

A "response action message" refers to any message that is sent by the smart device back to the cloud device after the smart device receives the action message from the cloud device. Each "response action message" includes the action identifier of the action message and also an action status. For example, each instance of an "action response message" may be referred to as the "second," "third," "fourth," etc., action response message in examples described below.

The action identifier (e.g., name) in the action response message is the same as the action identifier in the action message and is used to indicate the relationship between the action response message and the action message. The action status is used to indicate the smart device's action execution status with regard to the action message (e.g., specifically, the smart device's action execution status with regard to the action associated with the action identifier that is included in the action message). In various embodiments, the execution of an action is associated with various stages. The following are example stages associated with the execution of an action by a smart device:

First status type: indicates that the action message has been received at the smart device.

Second status type: indicates that the preparatory work of the action to be executed according to the control instruction/control arguments corresponding to the action identifier in the action message has been completed at the smart device.

Third status type: indicates that the action to be executed according to the control instruction/control arguments corresponding to the action identifier in the action message has been completed at the smart device.

Fourth status type: indicates that an exception occurred in relation to the action executed according to the control instruction/control arguments corresponding to the action identifier in the action message at the smart device.

Figure 7:
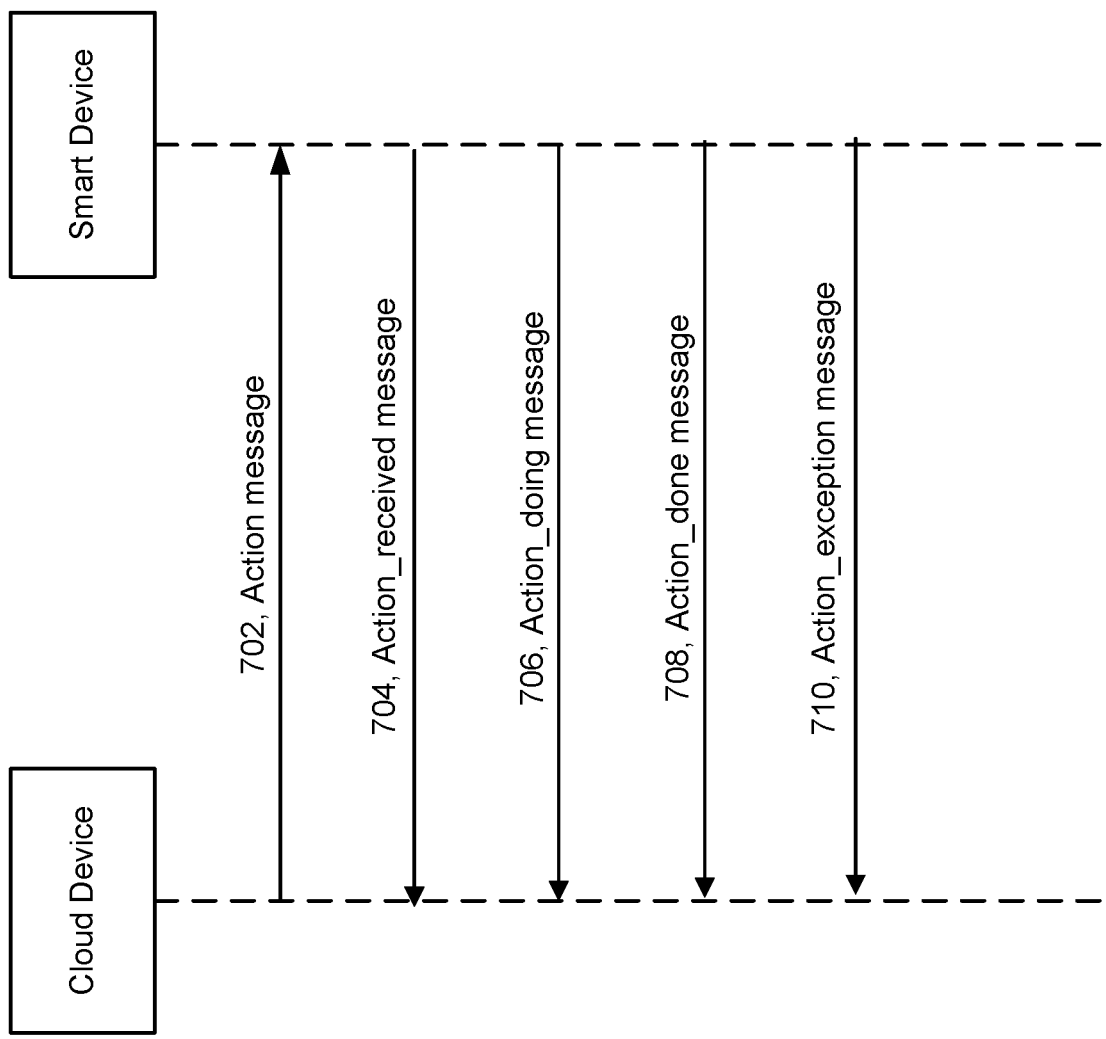
FIG. 7 is a sequence diagram showing example message exchanges between a cloud device and a smart device.

FIG. 7 is a sequence diagram showing example message exchanges between a cloud device and a smart device. The smart device and cloud device of the example of FIG. 7 may be implemented, for example, using smart device 102 and cloud device 104 of system 100 of FIG. 1. Process 400 of FIG. 4 may be implemented based at least in part on the sequence diagram of FIG. 7.

At 702, an action message is sent from a cloud device to a smart device, wherein the action message comprises an action identifier and one or more control arguments to a smart device.

At 704, a first action response message is sent from the smart device to the cloud device, wherein the first action message comprises the action identifier and the first status information.

The first action message in this step is uniquely identified by the action identifier and first status information. The first status information is shown as "Action_received" in FIG. 7 to indicate that the action message was received at the smart device.

At 706, a second action response message is sent from the smart device to the cloud device, wherein the second action response message comprises the action identifier and the second status information.

The second action response message in this step is uniquely identified by the action identifier and the second status information. The second status information is shown as "Action_doing" in FIG. 7 to indicate that the preparatory work of the action to be executed according to the control arguments in the action message has been completed at the smart device.

At 708, a third action response message is sent from the smart device to the cloud device, wherein the third action response message comprises the action identifier and the third status information.

The third action response message in this step is uniquely identified by the action identifier and the third status information. The third status information is shown as "Action_done" in FIG. 7 to indicate that the execution of the action that was identified in the action message has been completed according to the control arguments that were identified in the action message.

At 710, a fourth action response message is sent from the smart device to the cloud device, wherein the fourth action response message comprises the action identifier and the fourth status information.

The fourth action response message in this step is uniquely identified by the action identifier and the fourth status information. The fourth action response information is shown as "Action_exception" in FIG. 7 to indicate that an exception occurred in relation to the action to be executed according to the control arguments in the action message. It should be noted that step 710 does not necessarily appear after step 708, but may be generated at any time after step 702. So long as an exception occurs, there is a possibility that it will be executed.

As for the cloud device, in some embodiments, it will resend the action message (that includes the action identifier and one or more control arguments) if it fails to receive an action response message that includes the "Action_received" status information from the smart device within a set period of time after sending the action message. In some embodiments, the cloud device will resend the action message if it fails to receive an action message including the "Action_doing" status information within a set period of time after receiving the action message that includes the "Action_received" status information. In some embodiments, the cloud device will resend the action message if it fails to receive an action response message including the "Action_done" status information within a set period of time after receiving an action message including the "Action_doing" status information. In some embodiments, the cloud device will resend the action message if it receives an action response message that includes the "Action_exception" status information. In addition, a resend upper limit may be set for the number of times that the cloud device should resend the action message to the smart device so that the action message will no longer be resent from the cloud device to the smart device once the upper limit is reached.

In some embodiments, the various action statuses received by the cloud device may be sent to another control device that had sent the control instruction to the cloud device.

The following are examples of application scenarios of event processing between a smart device and a cloud device.

Application Scenario 1:

The developer took relevant events of the speech control module in a smart speaker and pre-registered them in the control center of the intelligent hardware. Moreover, these relevant events were also pre-registered on the cloud device. One of these events is "start speech recording." When the speech recording module in the smart speaker detects that a "start speech recording" event has been triggered, it reports the event name to the control center of the smart speaker.

The control center determines that the "start speech recording" event is a pre-registered event name that should be reported to a cloud device. The smart speaker then sends an event message containing the event name to the cloud device. The cloud device may not provide any confirmation regarding the event itself, but the cloud device may perform subsequent processing based on the event, e.g., recognizing the recorded speech contained by the event and issuing a control instruction corresponding to the start speech to the smart speaker, etc.

In such an application scenario, the event mechanism provided by the present application can link a smart device and a cloud device to each other.

Application Scenario 2:

After a status detecting module in a smart door or window detects that a door has been opened, the event name is reported to the control center in the smart door or window. After the control center determines that the event name relates to a registered event that should be reported to a cloud device, it uses an event message to report the event name to the cloud device.

After the cloud device receives the event message, the destination device identifier and control instruction corresponding to the event name are determined by the cloud device by looking up the pre-registered event registration information. Suppose that the determined destination device identifier refers to a smart lamp and the control instruction is an instruction to turn on the lamp. In that case, the cloud device sends the control instruction to turn on the lamp to the smart lamp. Such a scenario can achieve automatic illumination of a smart lamp after a user opens a door.

In such an application scenario, the event mechanism provided by the present application can link one smart device to another smart device through a cloud device.

Application Scenario 3:

A user mobile phone sends a control instruction via the cloud to a smart speaker to play the audio of a song titled "Little Apple." Correspondences between action identifiers and control instructions were stored in advance in a cloud device. After the cloud device receives from the user mobile phone the user initiated event to play the "Little Apple" audio, it uses the aforesaid correspondences as a basis to determine the action identifier corresponding to the instruction. For example, the action identifier is:

action1 name: play, args: "Little Apple"

wherein "action1 name" is the action identifier and "play" and "args: 'Little Apple'" are the control arguments.

Then the cloud device determines the destination terminal device (i.e., smart speaker) based on the ID2 (an Internet of Things ID which is centrally allocated by an identifier allocating device and which uniquely identifies the smart device) contained in the control instruction and sends the action message to the smart speaker. The action message may contain the following fields: action identifier and control arguments.

After receiving the action message, the smart speaker sends an action response message containing action_received as the status back to the cloud device. The action response message may include the following fields: action1 name and current action status (i.e., action_received). These two fields may uniquely identify the message currently returned by the smart speaker.

If the cloud device fails to receive back from the smart speaker the action response message containing action_received as the status within a set period of time, it may resend the action message.

After the smart speaker sends the action response message containing action_received as the status back to the cloud device, it begins the preparatory work for the action to be executed according to the control arguments in the action message. After it completes the preparatory work, it sends a second instance of an action response message containing action_doing as the status back to the cloud. The second instance of the action response message, which contains action_doing as the status may include the following fields: action1 name and current action status (i.e., action_doing). These two fields may uniquely identify the message currently returned by the smart speaker.

After executing the action of playing the "Little Apple" audio, the smart speaker sends a third instance of an action response message containing action_done as the status back to the cloud device. The third instance of the action response message, which contains action_done as the status may include the following fields: action1 name and current action status (i.e., action_done). These two fields may uniquely identify the instruction currently returned by the smart speaker.

If an exception occurs during the action execution process, the smart speaker may send a fourth instance of an action response message containing action_exception as the status back to the cloud. The fourth instance of the action response message, which contains action_exception as the status, may include the following fields: action1 name and current action status (i.e., action_exception). These two fields may uniquely identify the instruction currently returned by the smart speaker. In addition, the fourth instance of the action response message containing action_exception as the status may also include a parameter field indicating the specific type of exception.

The cloud device may learn the smart speaker's action execution status from the action status sent back by the smart speaker and thus ensure the monitoring of each status of the control instruction issued by the cloud device and executed on the intelligent hardware device. This guarantees the integrity and traceability of action execution. In addition, the cloud device may send the action status returned by the smart speaker back to the smart phone that sent the control instruction so that the user can promptly learn the execution status of the action.

Application Scenario 4:

This application scenario is a smart device-cloud device event mechanism.

The developer took relevant events of the speech control module in a smart speaker and pre-registered them in the IDJS CORE (control center) of intelligent hardware. Moreover, these relevant events were also pre-registered on the cloud device. One of these events is "start speech recording." When a smart speaker "start speech recording" event is triggered, the smart speaker sends the event to the cloud device. The cloud device may not provide any confirmation regarding the event itself, but it may perform subsequent processing based on the event, e.g., recognizing the recorded speech contained by the event, determining an action identifier and control arguments corresponding to the start speech recording instruction, placing them in an action message, and sending it.

Application Scenario 5:

After smart doors and windows detect a door opening event, the event is reported to the cloud device. The cloud device determines the action identifier, control arguments, and the destination terminal device corresponding to the event. For example, the determined action identifier is "action2 name," the control argument is "light," and the destination terminal device is a smart lamp. Thus, the cloud device uses an action message to send "action2 name" and its corresponding control argument to a smart lamp. After the smart lamp receives the action message, it may illuminate the smart lamp based on "action2 name" and its corresponding control argument in the message. Moreover, an action response message with a different status may be sent back.

Figure 8:
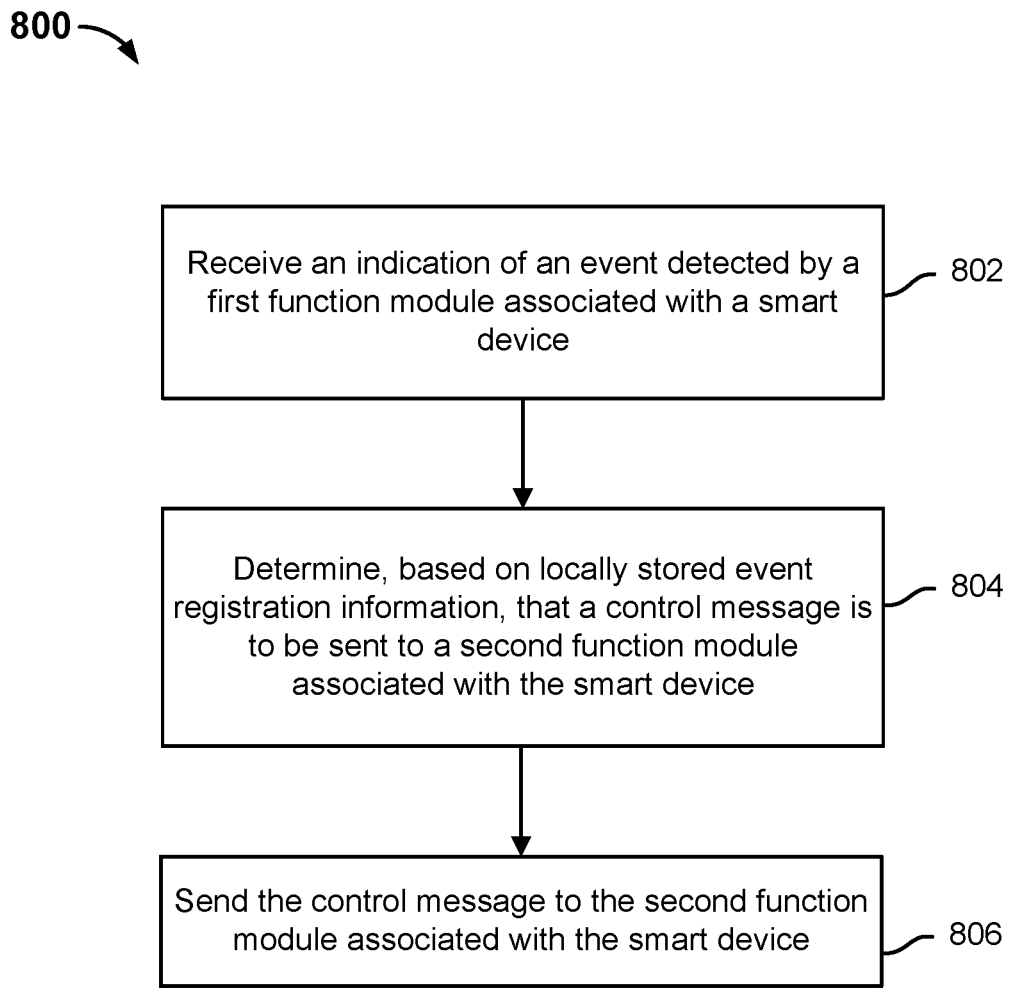
FIG. 8 is a flow diagram showing an embodiment of a process for event processing associated with a smart device.

FIG. 8 is a flow diagram showing an embodiment of a process for event processing associated with a smart device. In some embodiments, process 800 is implemented at smart device 102 of system 100 of FIG. 1. Specifically, in some embodiments, process 800 is implemented at a control center of smart device 102 of system 100 of FIG. 1.

Process 800 describes an embodiment in which an event that is reported by a first function module in a smart device causes the control center of the smart device to send an action message to a second function module in the smart device.

At 802, an indication of an event detected by a first function module associated with a smart device is received.

Step 802 may be implemented similarly to step 402 of process 400 of FIG. 4.

At 804, a control message is determined to be sent to a second function module associated with the smart device based at least in part on locally stored event registration information.

At 806, the control message is sent to the second function module associated with the smart device.

In some embodiments, the event name associated with the detected event is compared to stored event registration information to determine whether there is a match. In some embodiments, event registration information may comprise registering event names, event arguments, control instructions, and an identifier of a function module with which the function module that had detected the event has an interactive relationship. If the event name associated with the event that is detected by the function module matches an event name that is included in the stored event registration information, then a control message that includes the corresponding control instruction (and/or control arguments) is sent to the other function module whose identifier is associated with the matching event name in the stored event registration information. In response to the control message, the recipient function module is configured to execute the control instruction associated with the control message.

Figure 9:
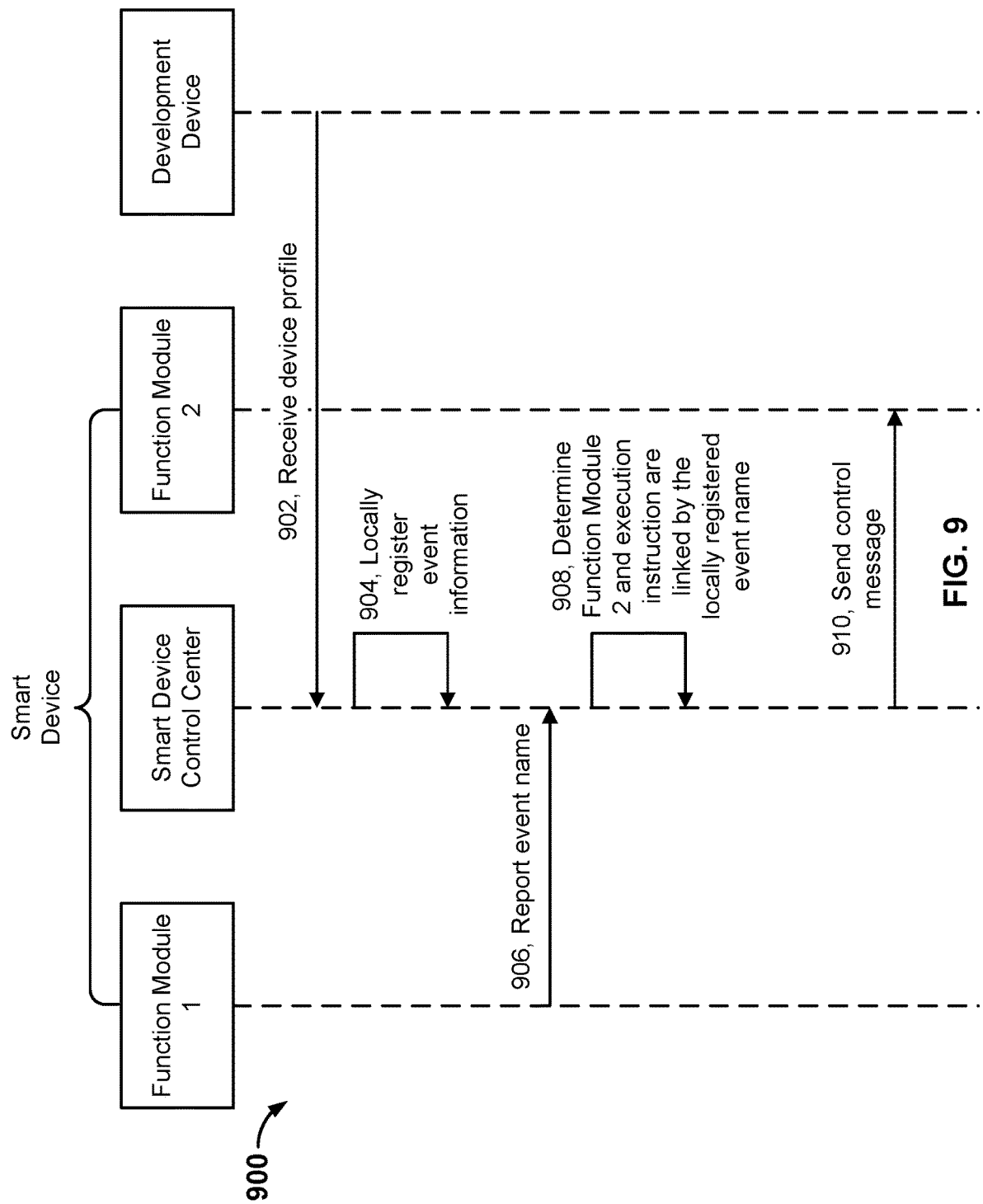
FIG. 9 is a sequence diagram showing an example of a process for event processing associated with a smart device.

FIG. 9 is a sequence diagram showing an example of a process for event processing associated with a smart device. The smart device, cloud device, and development device of the example of FIG. 9 may be implemented, for example, using smart device 102, cloud device 104, and development device 106 of system 100 of FIG. 1. Process 800 of FIG. 8 may be implemented using process 900.

At 902, a device profile sent by a development device is received at a control center associated with a smart device.

At 904, event registration is locally performed by the control center associated with the smart device based at least in part on the device profile, wherein event registration comprises storing event registration information comprising information associated with events detected by a first function module associated with the smart device for which a corresponding control message is to be sent to a second function module associated with the smart device.

Unlike process 400 of FIG. 4, in which the event registration is performed at the smart device and also the cloud device, in process 900, the event registration need only be performed at the smart device because control instructions are sent within the same smart device (instead of from the smart device to a cloud device, as is described in process 400). After the control center analyzes the device profile, it locally registers, from the device profile, the event names, the control instruction corresponding to each event name, and the identifier of the function module to which the control instruction corresponding to each event name is to be sent.

At 906, an event name associated with an event that is reported by function module 1 associated with the smart device is obtained by the control center.

After function module 1 detects the event, it reports the event name of the event to the control center.

At 908, it is determined by the control center associated with the device that the event name matches a control instruction to be sent to function module 2 that is within the stored event registration information.

If a locally registered function module (e.g., function module 2) has an interactive relationship with the event name that is detected by function module 1 (or another function module within the same smart device), a control message including the control instruction corresponding to the event name may be sent to that function module. The event that is detected by one function module of a smart device thus forms the basis for controlling another function module.

In 910, in response to the determination, the control center sends a control message including the determined control instruction to function module 2.

The following is an example of an application scenario of event processing between function modules within a smart device:

After a light detecting module in a smart lamp detects that brightness is lower than a preset threshold value, it sends the event name to the control center in the smart lamp. The control center determines that there is a corresponding function module and control instruction linked to the locally registered event name. That is, the event name is linked to a switching module of the smart lamp, and the corresponding control instruction is a "turn on lamp" instruction. The control center then sends a "turn on lamp" instruction to the switching module of the smart lamp. The smart lamp then turns on. Such a scenario can enable automatic illumination of a smart lamp when ambient light brightness drops below a threshold value.

As described in FIGS. 8 and 9, in some embodiments, event registration at the smart device end differs from event registration at the cloud device in that event registration at the smart device may include registering function module specific configuration information (registering function module specific configuration information is sometimes referred to as "function module registration") within the smart device that has interactive relationships with certain event names. As described above, a "function module" refers to a part of a smart device that has a specific function. Examples of a function module include power modules, control modules, and detection modules. In some embodiments, a developer uses a development device to send a function module registration file (which may be part of or separate from a device profile) to the control center of the smart device or directly sets it up in advance in the control center of the smart device. The smart device control center can perform function module registration based on the function module registration file. The function module registration file may include initialization process information for each function module, with the result that the smart device can automatically run the initialization process for each function module at system startup. In addition, function module registration files may also include action identifiers/control instructions supported by various function modules. As a result, after the control center receives an action instruction (e.g., from a function module that had detected an event), it can use the action identifiers in the file as a basis to determine the function module for executing the action and provide control arguments corresponding to the action identifier to the appropriate function module for execution of the action.

Use of the registration mechanism described herein will make upgrading the smart device even easier for the developer. For example, when there is a new action identifier, the device profile containing this new action identifier and the corresponding control arguments may be sent to the cloud device and the smart device. The cloud device and smart device can easily implement new action upgrades through the registration mechanism described herein. In the event registration processes for the cloud device and smart device, all of the action identifiers included in the device profile may be registered. It is also possible to register only the previously unregistered action identifiers while skipping action identifiers that are already locally stored.

Figure 10:
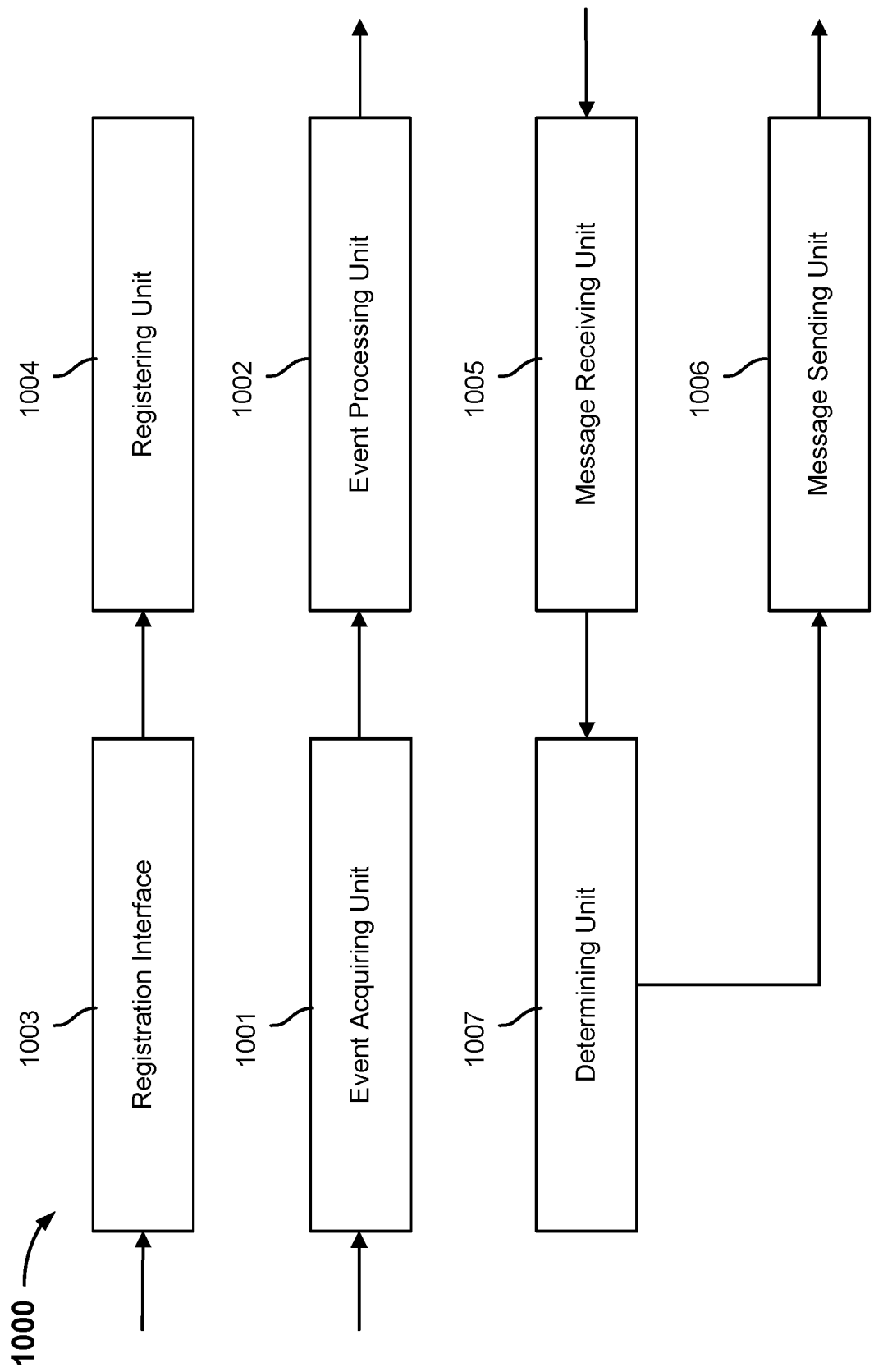
FIG. 10 is a structural diagram of an embodiment of a control center of a smart device.

FIG. 10 is a structural diagram of an embodiment of a control center of a smart device. Control center 1000 includes event acquiring unit 1001, event processing unit 1002, registration interface 1003, registering unit 1004, message receiving unit 1005, message sending unit 1006, and determining unit 1007.

The units can be implemented as software components executing on one or more processors, as hardware such as programmable logic devices, and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices.

Event acquiring unit 1001 is configured to receive an event name that is reported by a function module of the smart device. In various embodiments, each of the various function modules in the smart device performs monitoring of the events that it supports. As soon as a function module detects an event, it reports the event to event acquiring unit 1001 of control center 1000.

Event processing unit 1002 is configured to use stored event registration information to determine and send an event message to a cloud device or to send a control message to a function module linked to the reported event. Put another way, the processing of a detected event may entail two possible scenarios; one scenario includes reporting the event name of the detected event to a cloud device (e.g., to connect the smart device to the cloud device) and the other scenario includes sending a control message to another function module of the same smart device (e.g., to implement interactions between two or more function modules within the same smart device).

With regard to the first scenario described above in which the event name of the detected event is reported to the cloud device via an event message, the following approach to registration may be adopted at control center 1000 of the smart device:

Registration interface 1003 is configured to receive a device profile sent by a development device or receive a locally configured device profile. The developer may define a device profile for its own intelligent hardware (i.e., smart device) and then use a development device to send the device profile to the smart device. In this manner, the smart device developer can implement remote event configuration.

In this first scenario, a device profile may define event names and their corresponding event arguments.

Registering unit 1004 is configured to locally register event names and corresponding event arguments that are included in received device profiles. For example, local registration includes: registering unit 1004 analyzing a device profile and locally registering only the event names that are included in the device profile, or locally registering the event names as well as the event arguments corresponding to the event names that are included in the device profile. These registered event names are the event names that are reported to the cloud device in the event that the corresponding events are detected at the smart device.

In such a scenario, event acquiring unit 1001 is configured to receive an event name that is reported by a function module of the smart device. If the event name received by event acquiring unit 1001 matches a locally registered event name, then event processing unit 1002 is configured to send an event message including the event name to the cloud device.

When event processing unit 1002 sends an event message to the cloud device, it may send an event message including just the event name to the cloud device. Such an approach may be applied to the cloud device if the event name and its corresponding event arguments were registered at the cloud device during event registration at the cloud device. Or alternatively, when event processing unit 1002 sends an event message to the cloud device, it may send an event message including the event name and the event arguments corresponding to the event name to the cloud device. Such a situation may apply to the cloud device when the event arguments corresponding to the event name were not registered at the cloud device during event registration at the cloud device.

With regard to the second scenario described above, i.e., event-based triggering of sending another function module, event registration information in such a scenario may include: registering, at the smart device, the event name and the corresponding identifier of the function module and the control instruction linked to the event name.

In such a scenario, event acquiring unit 1001 is configured to receive the event name reported by the function module, and event processing unit 1002 is configured to determine the function module and control instruction linked to the locally registered event name received by event acquiring unit 1001. Then, event processing unit 1002 is configured to send the determined control instruction to the linked function module.

In addition to performing event registration, in some embodiments, smart device event registration may also include performing function module registration. Registration interface 1003 is configured to receive a function module registration file that was sent by a development device or that was locally pre-configured. Registering unit 1004 is configured to perform function module registration based on the function module registration file. The function module registration file may include each function module's initialization process information, which is used to automatically run the initialization process for each function module at system startup, and the event names whose reporting is supported by each function module.

Returning to the first scenario, event processing unit 1002 may also be configured to receive an event response message sent back by the cloud device. If the event response message has not been received within a set time period after the event message was sent to the cloud device, the event message may be resent to the cloud device. The number of times the event message is resent may be determined based on a predetermined limit.

Message receiving unit 1005 is configured to receive an action message sent by the cloud device in response to the event message. The first message includes an action identifier.

Message sending unit 1006 is configured to send an action response message (an action response message that is sent subsequent to the action message) back to the cloud device. The action response message includes the action identifier of the action message and an action status. The action status is used to indicate the action execution status of the action message by the smart device.

Determining unit 1007 is configured to use the action identifier that is included in the action message to determine the registered control arguments corresponding to the action identifier so that the control arguments can be used to execute the corresponding action.

In some embodiments, the action message may also include control arguments corresponding to the action identifier so that the smart device can use the control arguments to execute the corresponding action.

The action status may include the four example types of statuses as described below:

First status type: indicates that the action message has been received at the smart device.

Second status type: indicates that the preparatory work of the action to be executed according to the control instruction/control arguments corresponding to the action identifier in the action message has been completed at the smart device.

Third status type: indicates that the action to be executed according to the control instruction/control arguments corresponding to the action identifier in the action message has been completed at the smart device.

Fourth status type: indicates that an exception occurred in relation to the action executed according to the control instruction/control arguments corresponding to the action identifier in the action message at the smart device.

Figure 11:
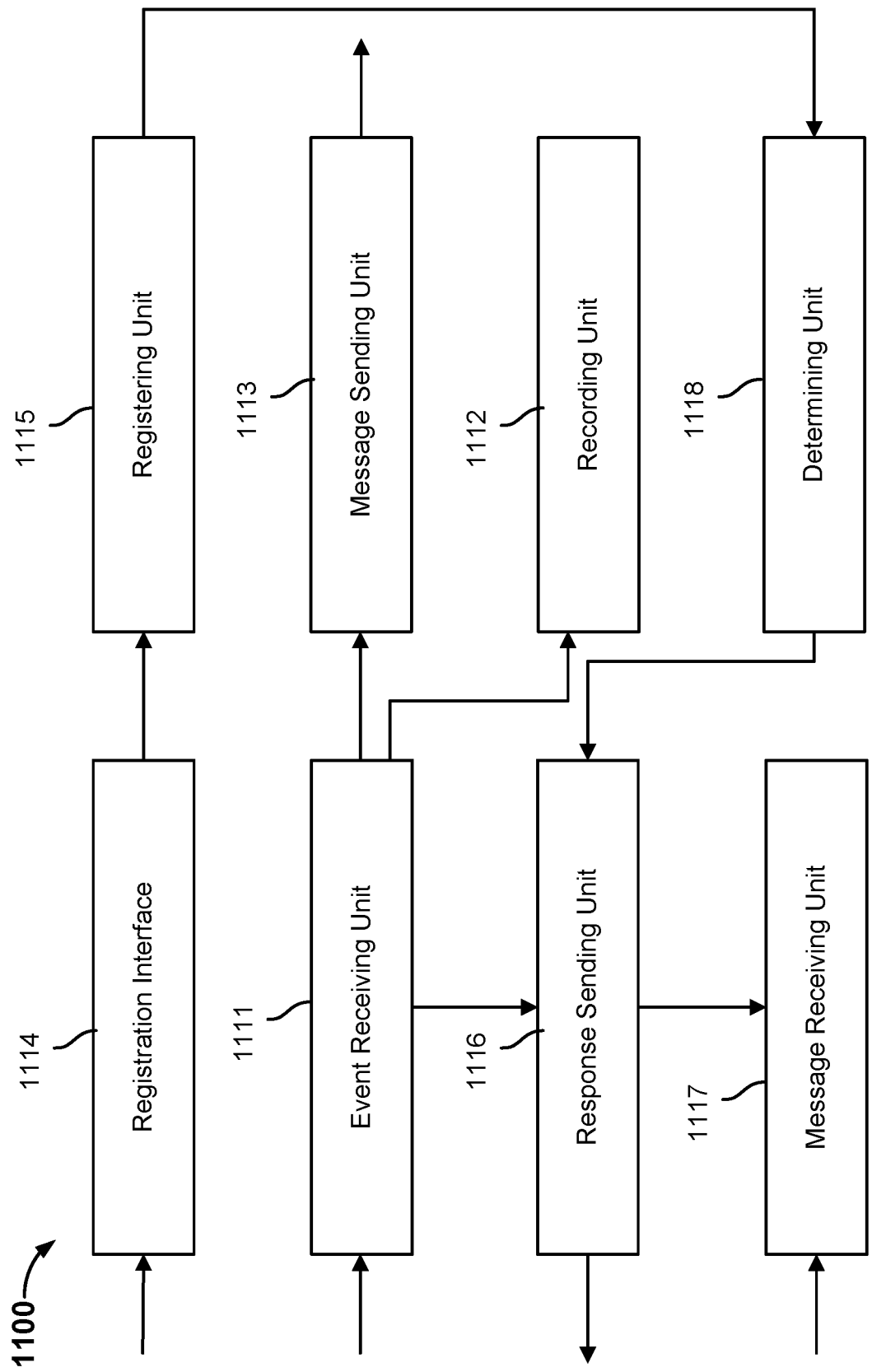
FIG. 11 is a structural diagram of an embodiment of a cloud device.

FIG. 11 is a structural diagram of an embodiment of a cloud device. Cloud device 1100 includes event receiving unit 1111, recording unit 1112, message sending unit 1113, registration interface 1114, registering unit 1115, response sending unit 1116, message receiving unit 1117, and determining unit 1118.

Event receiving unit 1111 is configured to receive an event message reported by a smart device. The event message may include just an event name. Such a situation is applicable when a cloud device registers both event names and their corresponding event arguments. Alternatively, the event message may include: the event name and the event arguments corresponding to an event name. Such a situation is applicable when a cloud device registers just event names, for example.

After an event message is received, recording unit 1112 is configured to record the information included in the event message. In response to receipt of the event message, the cloud device may or may not confirm the event message from the smart device. For example, event receiving unit 1111 may not send a response back to the smart device after receiving the event message in the event that the event name included in the event message does not match an event name that is locally registered at the cloud device. After event receiving unit 1111 receives an event message, response sending unit 1116 may also send an event response message back in response to the event message, back to the smart device.

Furthermore, message sending unit 1113 may also send an action message based on the event message to the smart device that had sent the event message or a smart device other than the smart device that had sent the event message. This action message includes an action identifier.

Message receiving unit 1117 is configured to receive an action response message that relates to the action message and that was sent back by the smart device. The action response message includes the action identifier and an action status. The action status indicates the action execution status of the control instruction associated with the action identifier that is included in the action message that was sent to the smart device.

Determining unit 1118 is configured to obtain control arguments corresponding to the registered action identifier and include the control arguments in the action message.

Examples of the action status may include, but are not limited to, the four types of status below:

First status type: indicates that the action message has been received at the smart device.

Second status type: indicates that the preparatory work of the action to be executed according to the control instruction/control arguments corresponding to the action identifier in the action message has been completed at the smart device.

Third status type: indicates that the action to be executed according to the control instruction/control arguments corresponding to the action identifier in the action message has been completed at the smart device.

Fourth status type: indicates that an exception occurred in relation to the action executed according to the control instruction/control arguments corresponding to the action identifier in the action message at the smart device.

With regard to event registration on a cloud device, the developer may send a device profile to the cloud device via a development device. Registration interface 1114 receives the device profile sent by the development device. Registering unit 1115 uses a device profile as a basis to locally register event information (e.g., event names and/or corresponding event arguments) and the control instructions corresponding to the event information, or to locally register event information, destination device identifiers, and control instructions corresponding to the event information.

Figure 12:
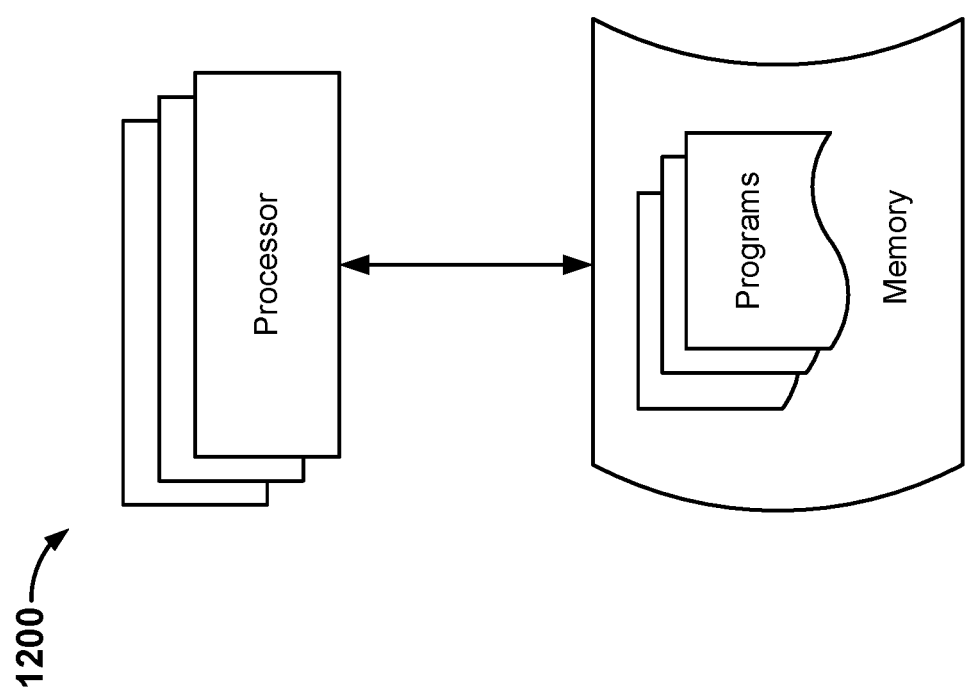
FIG. 12 is a structural diagram showing an embodiment of a system for event processing.

FIG. 12 is a structural diagram showing an embodiment of a system for event processing. System 1200 includes one or more processors and further comprises memory and one or more programs. The one or more programs are stored in the memory and are executed by the one or more processors to implement the processes described above.

Figure 13:
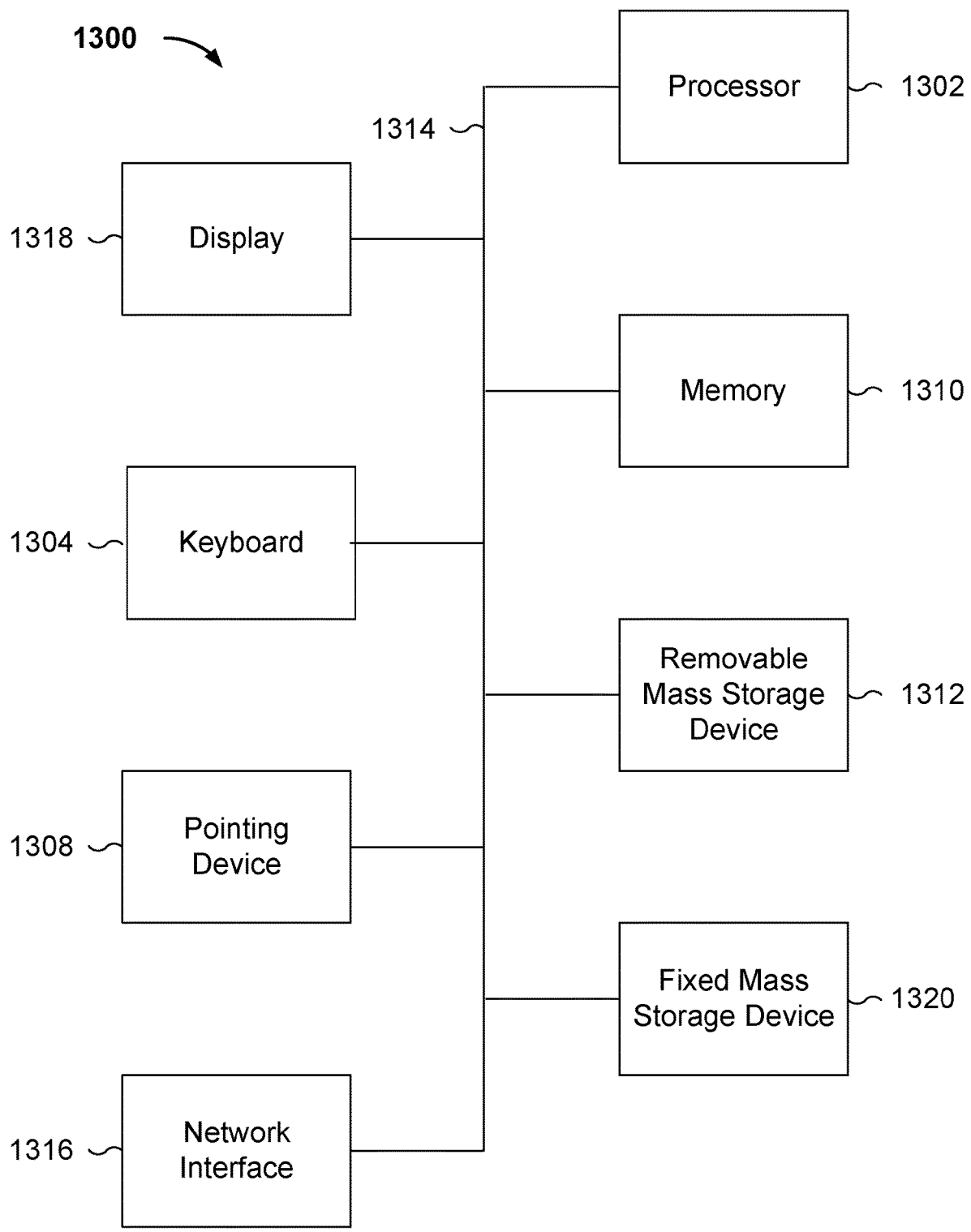
FIG. 13 is a functional diagram illustrating an embodiment of a programmed computer system for event processing associated with a smart device.

FIG. 13 is a functional diagram illustrating an embodiment of a programmed computer system for event processing associated with a smart device. As will be apparent, other computer system architectures and configurations can be used to process events associated with a smart device. Computer system 1300, which includes various subsystems as described below, includes at least one microprocessor subsystem (also referred to as a processor or a central processing unit (CPU)) 1302. For example, processor 1302 can be implemented by a single-chip processor or by multiple processors. In some embodiments, processor 1302 is a general purpose digital processor that controls the operation of the computer system 1300. Using instructions retrieved from memory 1310, the processor 1302 controls the reception and manipulation of input data, and the output and display of data on output devices (e.g., display 1318).

Processor 1302 is coupled bi-directionally with memory 1310, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1302. Also as is well known in the art, primary storage typically includes basic operating instructions, program code, data, and objects used by the processor 1302 to perform its functions (e.g., programmed instructions). For example, memory 1310 can include any suitable computer readable storage media, described below, depending on whether, for example, data access needs to be bi-directional or uni-directional. For example, processor 1302 can also directly and very rapidly retrieve and store frequently needed data in a cache memory (not shown).

A removable mass storage device 1312 provides additional data storage capacity for the computer system 1300 and is coupled either bi-directionally (read/write) or uni-directionally (read only) to processor 1302. For example, storage 1312 can also include computer readable media such as magnetic tape, flash memory, PC-CARDS, portable mass storage devices, holographic storage devices, and other storage devices. A fixed mass storage 1320 can also, for example, provide additional data storage capacity. The most common example of fixed mass storage 1320 is a hard disk drive. Mass storages 1312, 1320 generally store additional programming instructions, data, and the like that typically are not in active use by the processor 1302. It will be appreciated that the information retained within mass storages 1312 and 1320 can be incorporated, if needed, in standard fashion as part of memory 1310 (e.g., RAM) as virtual memory.

In addition to providing processor 1302 access to storage subsystems, bus 1314 can also be used to provide access to other subsystems and devices. As shown, these can include a display 1318, a network interface 1316, a keyboard 1304, and a pointing device 1308, as well as an auxiliary input/output device interface, a sound card, speakers, and other subsystems as needed. For example, the pointing device 1308 can be a mouse, stylus, track ball, or tablet, and is useful for interacting with a graphical user interface.

The network interface 1316 allows processor 1302 to be coupled to another computer, computer network, or telecommunications network using a network connection as shown. For example, through the network interface 1316, the processor 1302 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1302 can be used to connect the computer system 1300 to an external network and transfer data according to standard protocols. For example, various process embodiments disclosed herein can be executed on processor 1302, or can be performed across a network such as the Internet, intranet networks, or local area networks, in conjunction with a remote processor that shares a portion of the processing. Additional mass storage devices (not shown) can also be connected to processor 1302 through network interface 1316.

An auxiliary I/O device interface (not shown) can be used in conjunction with computer system 1300. The auxiliary I/O device interface can include general and customized interfaces that allow the processor 1302 to send and, more typically, receive data from other devices such as microphones, touch-sensitive displays, transducer card readers, tape readers, voice or handwriting recognizers, biometrics readers, cameras, portable mass storage devices, and other computers.

For example, computer system 1300 may comprise a smart device or a cloud device.

It should be noted that in the several embodiments provided by the present invention, the disclosed system, device, and method may be realized in other ways. For example, the device embodiment described above is merely illustrative. For example, the delineation of units is merely a delineation according to local function. The delineation can take a different form during actual implementation.

Units described as separate components may or may not be physically separate, and components displayed as units may or may not be physical units. They can be located in one place, or they can be distributed across multiple network units. The embodiment schemes of the present embodiments can be realized by selecting part or all of the units in accordance with actual need.

In addition, all the functional units in the various embodiments of the present invention could be integrated in a processing unit. Or each unit could physically exist on its own, or two or three or more units could be integrated into one unit. The aforesaid integrated units can take the form of hardware, or they can take the form of hardware combined with software function units.

The units described above, in which the software function units are integrated, can be stored in a computer-readable storage medium. The software function units described above are stored in a storage medium and include a number of instructions whose purpose is to cause a piece of computer equipment (which can be a personal computer, a server, or network computer) or a processor to execute some of the steps in the method described in the various embodiments of the present invention. The storage medium described above encompasses: USB flash drive, mobile hard drive, read-only memory (ROM), random access memory (RAM), magnetic disk, or optical disk, or various other media that can store program code.

The preferred embodiments of the present invention that are described above are merely that and do not limit the present invention. Any modification, equivalent substitution, or improvement that is made in keeping with the spirit and principles of the present invention shall be included within the protective scope of the present invention.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a function module registration file, wherein the function module registration file includes a corresponding first set of event names of events to be detected by a first function module at the system and a corresponding second set of event names of events to be detected by a second function module at the system;
execute corresponding initialization processes for the first function module and the second function module based at least in part on the function module registration file;
store event registration information using the function module registration file by storing the corresponding first set of event names of events to be detected by the first function module at the system and storing the corresponding second set of event names of events to be detected by the second function module at the system;
receive an indication of an event detected by the first function module at the system;
determine, based at least in part on the event registration information, that an event message is to be sent to a cloud device, wherein the event message includes an event name associated with the event detected by the first function module; and
send the event message to the cloud device; and
a memory coupled to the processor and configured to provide instructions to the processor.

2. The system of claim 1, wherein the processor is further configured to:
receive a device profile from a development device; and
store the event registration information based at least in part on the device profile.

3. The system of claim 1, wherein the event message includes the event name associated with the event, one or more event arguments associated with the event, or both.

4. The system of claim 1, wherein the processor is further configured to:
determine at least a set period of time has passed since the event message has been sent to the cloud device;
determine that a response has not been received from the cloud device during the set period of time; and
in response to the determination that the response has not been received from the cloud device during the set period of time, resend the event message to the cloud device.

5. The system of claim 1, wherein the processor is further configured to:
receive an action message from the cloud device, wherein the action message comprises an action identifier, one or more control arguments, or both;
determine a control instruction corresponding to the action identifier; and
execute the control instruction.

6. The system of claim 5, wherein the processor is further configured to send an action response message to the cloud device, wherein the action response message comprises the action identifier and an action status.

7. The system of claim 6, wherein the action status comprises one or more of the following: data indicating that the action message has been received at the system, data indicating that preparatory work of an action associated with the action identifier according to the one or more control arguments has been completed at the system, data indicating that the action associated with the action identifier according to the one or more control arguments has been completed at the system and data indicating that an exception has occurred in relation to the action executed according to the one or more control arguments at the system.

8. A method, comprising:
- receiving a function module registration file, wherein the function module registration file includes a corresponding first set of event names of events to be detected by a first function module at a system and a corresponding second set of event names of events to be detected by a second function module at the system;
- executing corresponding initialization processes for the first function module and the second function module based at least in part on the function module registration file;
- storing event registration information using the function module registration file by storing the corresponding first set of event names of events to be detected by the first function module at the system and storing the corresponding second set of event names of events to be detected by the second function module at the system;
- receiving an indication of an event detected by the first function module at the system;
- determining, based at least in part on the event registration information, that an event message is to be sent to a cloud device, wherein the event message includes an event name associated with the event detected by the first function module; and
- sending the event message to the cloud device.

9. The method of claim 8, further comprising:
- receiving a device profile from a development device; and
- storing the event registration information based at least in part on the device profile.

10. The method of claim 8, further comprising:
- receiving an action message from the cloud device, wherein the action message comprises an action identifier, one or more control arguments, or both;
- determining a control instruction corresponding to the action identifier; and
- executing the control instruction.

11. The method of claim 10, further comprising sending an action response message to the cloud device, wherein the action response message comprises the action identifier and an action status.

12. A system, comprising:
- a processor configured to:
  - receive a function module registration file, wherein the function module registration file includes a corresponding first set of event names of events to be detected by a first function module at the system and a corresponding second set of event names of events to be detected by a second function module at the system, wherein the first function module has an interactive relationship with the second function module;
  - execute corresponding initialization processes for the first function module and the second function module based at least in part on the function module registration file;
  - store event registration information using the function module registration file by storing the corresponding first set of event names of events to be detected by the first function module at the system and storing the corresponding second set of event names of events to be detected by the second function module at the system;
  - receive an indication of an event detected by the first function module at the system;
  - determine, based at least in part on the event registration information, that a control message is to be sent to the second function module, wherein the control message is determined based at least in part on an event name associated with the event detected by the first function module; and
  - send the control message to the second function module at the system; and
- a memory coupled to the processor and configured to provide instructions to the processor.

13. The system of claim 12, wherein the processor is further configured to:
- receive an action instruction from the first function module; and
- use the event registration information to determine that the second function module supports an action associated with the action instruction, wherein the control message comprises a control instruction associated with the action.

14. The system of claim 12, wherein the processor is further configured to use the event registration information to determine that the second function module is linked to the event and to determine a control instruction to be sent to the second function module, wherein the control instruction is identified in the control message.

15. A method, comprising:
- receiving a function module registration file, wherein the function module registration file includes a corresponding first set of event names of events to be detected by a first function module at a system and a corresponding second set of event names of events to be detected by a second function module at the system, wherein the first function module has an interactive relationship with the second function module;
- executing corresponding initialization processes for the first function module and the second function module based at least in part on the function module registration file;
- storing event registration information using the function module registration file by storing the corresponding first set of event names of events to be detected by the first function module at the system and storing the corresponding second set of event names of events to be detected by the second function module at the system;
- receiving an indication of an event detected by the first function module at the system;
- determining, based at least in part on the event registration information, that a control message is to be sent to the second function module, wherein the control message is determined based at least in part on an event name associated with the event detected by the first function module; and
- sending the control message to the second function module at the system.

16. The method of claim 15, further comprising using the event registration information to determine that the second function module is linked to the event and to determine a control instruction to be sent to the second function module, wherein the control instruction is identified in the control message.

17. The method of claim 11, wherein the action status comprises one or more of the following: data indicating that the action message has been received at the system, data indicating that preparatory work of an action associated with the action identifier according to the one or more control arguments has been completed at the system, data indicating that the action associated with the action identifier according to the one or more control arguments has been completed at the system, and data indicating that an exception has occurred in relation to the action executed according to the one or more control arguments at the system.

\* \* \* \* \*